R. W. Trude.
Water Wheel.

N° 98,319. Patented Dec. 28, 1869.

Witnesses.
A. W. Almquist
Wm. F. Lelash

Inventor.
R. W. Trude
per Munn & Co

United States Patent Office.

R. W. TRUDE, OF CLEARFIELD BRIDGE, PENNSYLVANIA.

Letters Patent No. 98,319, dated December 28, 1869

IMPROVEMENT IN WATER-WHEELS.

The Schedule referred to in these Letters Patent and making part of the same.

*To all whom it may concern:*

Be it known that I, R. W. TRUDE, of Clearfield Bridge, in the county of Clearfield, and State of Pennsylvania, have invented a new and improved Water-Wheel; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to furnish an improved water-wheel, simple in construction, effective in operation, and which will not be impeded in its operation by back-water; and It consists in the water-wheel constructed as hereinafter more fully described.

A represents the frame in bearings, in which the shaft B, of the wheel C, revolves, and to which the casing D is securely attached.

Figure 3:
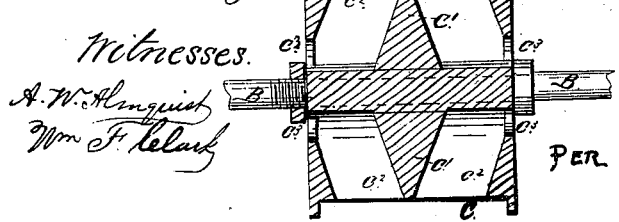
Figure 3 is a detail sectional view of the same, taken through the line $y\ y$, fig. 2.

The wheel C is made double, that is to say, is made with a central partition, $c^1$, as shown in fig. 3.

Figure 2:
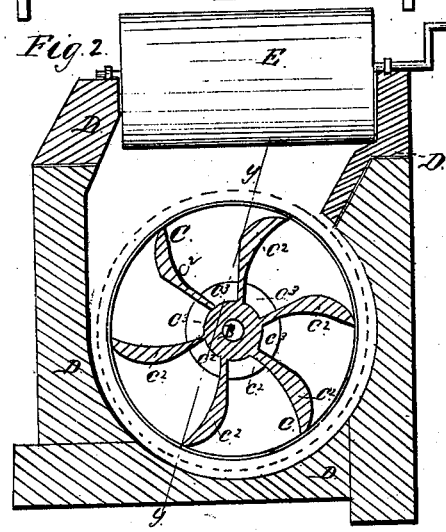
Figure 2 is a vertical section of the same, taken through the line $x\ x$, fig. 1.

The buckets, $c^2$, are made curved, as shown, and the water escapes from them through vents or openings $c^3$, in the ends of the wheel around the shaft B, as shown in figs. 2 and 3.

The ends of the wheel are made with circular flanges around their circumferences, which overlap the sides of the casing D.

The upper part of the casing, which forms the throat, through which the water passes to the buckets, is made incline or concaved, as shown in fig. 2, to so guide the entering water that it may strike the buckets of the wheel in the proper direction, to best utilize its power.

Figure 1:
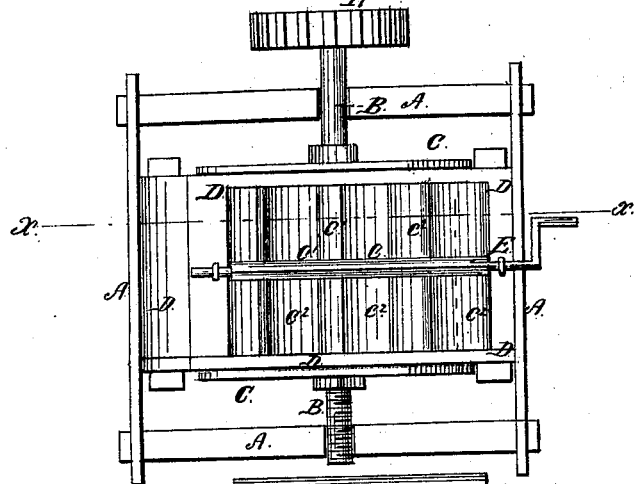
Figure 1 is a top view of my improved water-wheel, the gate being open.

E is the gate, which is pivoted at the centre of its ends to the upper part of the casing D, as shown in figs. 1 and 2.

To one end of the wheel-shaft B is attached a gear-wheel, F, from which motion is communicated to the machinery to be driven.

Having thus described my invention,

I claim as new, and desire to secure by Letters Patent—

1. The double wheel C, provided with vents or openings, for the escape of the water around the shaft B, and constructed substantially as herein shown and described, in combination with the casing D, as and for the purpose set forth.

2. The combination of the wheel C, casing D, and gate E, with each other, said parts being constructed and operating substantially as herein shown and described, and for the purpose set forth.

R. W. TRUDE.

Witnesses:
WM. A. READ,
J. F. MULLEN.